United States Patent
White et al.

(10) Patent No.: US 9,087,267 B2
(45) Date of Patent: *Jul. 21, 2015

(54) IMAGE SCENE RECOGNITION

(75) Inventors: Steven White, Plano, TX (US); Ashok Ramadass, Allen, TX (US)

(73) Assignee: IMAGE VISION LABS, INC., Anna, TX (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/493,986

(22) Filed: Jun. 11, 2012

(65) Prior Publication Data

US 2012/0314959 A1     Dec. 13, 2012

Related U.S. Application Data

(60) Provisional application No. 61/520,425, filed on Jun. 10, 2011, provisional application No. 61/520,380, filed on Jun. 10, 2011.

(51) Int. Cl.
*G06K 9/48* (2006.01)
*G06K 9/46* (2006.01)

(52) U.S. Cl.
CPC .................................... *G06K 9/4671* (2013.01)

(58) Field of Classification Search
CPC .. G06K 9/4671; G06K 9/3233; G06K 9/4676
See application file for complete search history.

(56) References Cited

U.S. PATENT DOCUMENTS 8,644,606 B2 * 2/2014 White et al. ............... 382/165
2012/0084305 A1   4/2012 Inoue et al.

* cited by examiner

*Primary Examiner* — Chan Park
*Assistant Examiner* — Elisa Rice
(74) *Attorney, Agent, or Firm* — Fish & Richardson P.C.

(57) ABSTRACT

Systems, methods, and computer program products may be directed to creating an image hash. Key points can be identified at different locations within a sample image. Descriptor vectors for the key points can be identified, the descriptor vectors describing local image information around the key points, where each descriptor vector is an n-dimensional array. Key points can be generated based on hashes of data vectors that include at least one of the descriptors, where each feature is a 36×20 hash value.

9 Claims, 2 Drawing Sheets

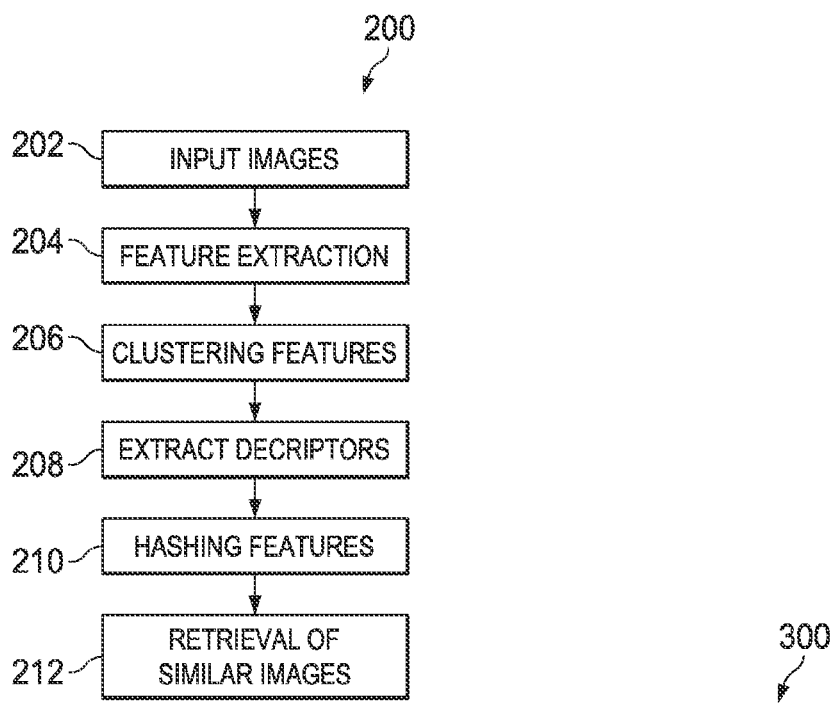
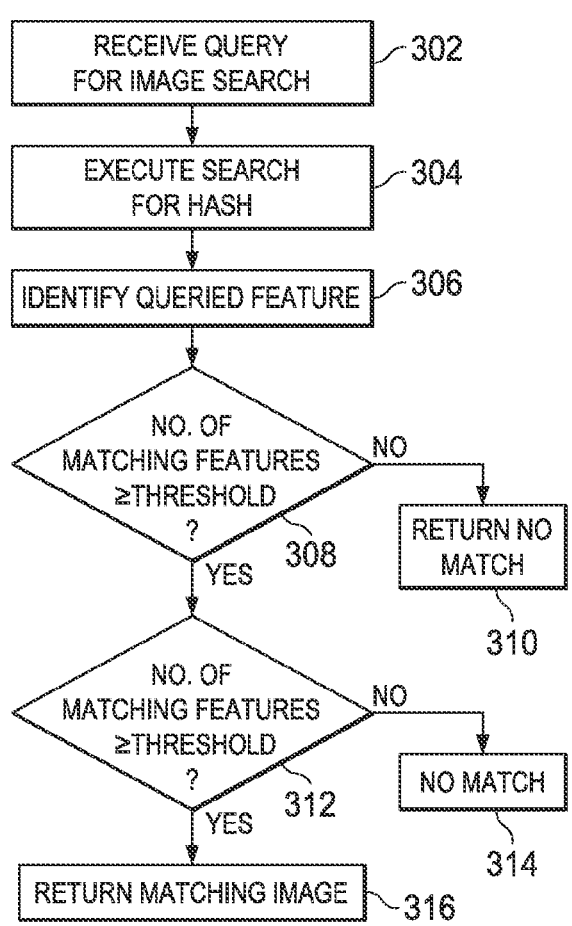
FIG. 2
FIG. 3

IMAGE SCENE RECOGNITION

CLAIM OF PRIORITY

The present application claims priority under 35 U.S.C. §119(e) to U.S. Provisional Patent Applications having Ser. Nos. 61/520,380 and 61/520,425 filed Jun. 10, 2011, the entire contents of which are incorporated herein by reference.

FIELD

The present application is directed to image scene recognition, and more particularly, to image scene recognition using hash-based image signatures.

BACKGROUND

A significant amount of finances has recently been invested in cloud computing and web-based control of data, as well as remote storage of data. Controlling Internet content has become. Inappropriate images or unlicensed material have been disclosed despite control systems. Current systems may use large amounts of bandwidth and assistance of manual users to search a high volume of material.

SUMMARY

The present disclosure is directed to systems, methods, and computer program products directed to image scene recognition. The image scene recognition may include creating an image hash. From an image, features may be identified at different locations within a sample image. Key points and descriptor vectors for each key points can be identified. The descriptor vectors may describe local image information around a key point. Each descriptor vector may be described as an n-dimensional array. A hash function can be applied to each descriptor. The hash function can include at least one of the descriptors. Each key point corresponds to a 36×20 hash value calculated by utilizing a fast algorithm in combination with a sift algorithm, and, in certain implementations, a quantization function mapping an orientation of each key point to a range of integers.

In certain implementations, the hash values are performed using a hash function for which a probability that the hash of an arbitrary first vector corresponds to the hash of an arbitrary second vector is a function of an range between the first vector and the second vector. In certain implementations, the hash function generates a characteristic data string from a data vector larger than the characteristic data string. The arbitrary first vector is a first descriptor vector, and the arbitrary second vector is a second descriptor vector.

In certain implementations, each feature corresponds to multiple key points, and each feature is a 36×20 has value. In certain implementations, each feature may include a hash value of a first descriptor vector for a first key point, a hash value of a second descriptor vector for a second key point, a first quantization function mapping an orientation of the first key point in relation to the second key point to a range of integers, and a second quantization function mapping an orientation of the second key point in relation to the first key point to the range of integers.

The present disclosure is also directed to identifying objects from digitally captured images thereof that use image characteristics to identify the object from a plurality of objects in a database. The video is broken down into parameters of images. The image identification process creates scene selections where segments of the video with the same scene are treated as one image. The video is scanned for particulars such as color detection, skin tone detection, shape detection, pose detection, background detection, and view comparison with object data. Based on calculating a score for matching characteristics, a scene is treated as one image and the first image is scanned for illicit material and compared with one or more databases to identify the actual object of a digital image. When an image is computed, each following matching image is grouped with the original for later scanning purposes. A 20 second video with a matching image throughout would be categorized as one image and only the image would need to be scanned.

When the scene changes, a new image is created for scanning purposes and compared to previous databases to be flagged for illicit material. Scanning these groups as singular images increases scanning speed while reducing bandwidth needs.

DESCRIPTION OF THE DRAWINGS

FIG. 2 is a process flow diagram for create hash values for an image.

FIG. 3 is a process flow diagram for retrieving an image hash from a database.

DETAILED DESCRIPTION

Figure 1:
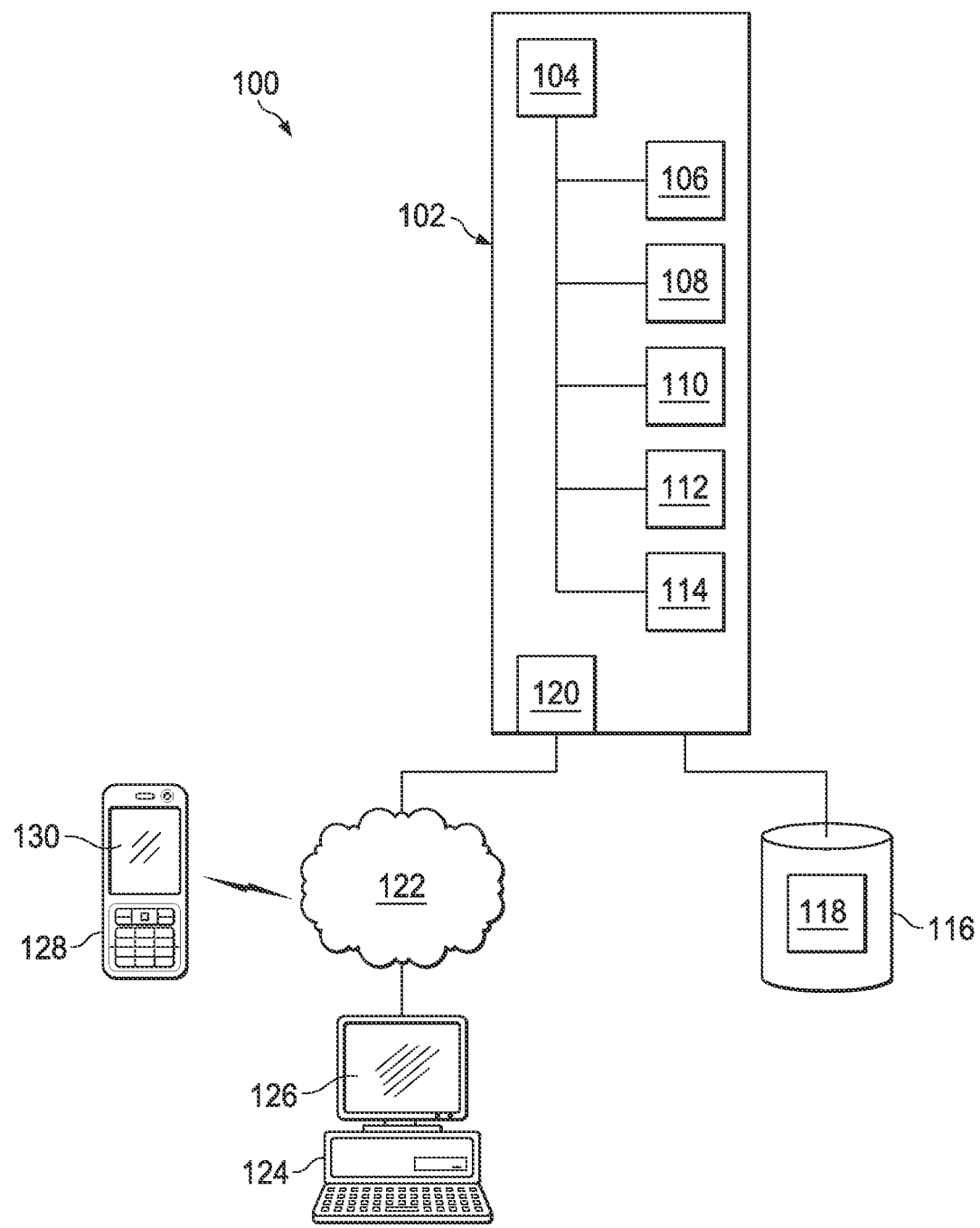
FIG. 1 is a block diagram of an example system for image scene recognition.

Images can often have inappropriate material ranging from copyright protected material to obscene pornographic material. A fast algorithm is an algorithm to search for multiple patterns at the same time. The algorithm is faster than previous algorithms and can support a very large number of patterns. Several applications of the multi-pattern matching problem can be used in conjunction with the fast algorithm. In addition to previous applications that required such search, the fast algorithm for multi-pattern matching can be used in lieu of indexed or sorted data in some applications involving small to medium size datasets. Its advantage, of course, is that no additional search structure is needed.

The multi-pattern matching problem has many applications. It is used in data filtering (also called data mining) to find selected patterns, for example, from a stream of newsfeed; it is used in security applications to detect certain suspicious keywords; it is used in searching for patterns that can have several forms such as dates; it is used in glimpse to support Boolean queries by searching for all terms at the same time and then intersecting the results; and it is used in DNA searching by translating an approximate search to a search for a large number of exact patterns. There are other applications. A Fast algorithm uses a pattern relationship such that features have a specific orientation and distance from each other.

For example, a picture of a building with specific window, the algorithm will use the points of the building such as a corner of the walls, the intersection of the window and wall and the relationship between the two, such as the distance apart in an x-y plane. The x-y plane can also be rotated around the Z axis such that one may be above the other in one instance, but the points interchanged in the other instance. The detection using the Fast algorithm will still detect a similar hash despite the said orientation of the images as long as the spatial relationship is the same.

The Fast algorithm uses a key point extraction as described above and also implements a saliency function of color image derivatives. Threshold the local image and find all of the local maxima points. All of these points are segment test detectors.

The algorithm uses a continuous arc of "N" or more pixels and uses a Naive-Bayes classification for corners and edges. These obtained corner key points are Fast key points.

The Fast algorithm uses descriptors. Those descriptors are key point neighboring pixels which are determined to be much brighter, much darker, or similar. These descriptors represent a ring of ternary vectors. These obtained ternary vectors are the Fast descriptors. The temr "obtain" may include identifying, creating, calculating, retrieving, generating, computing, or otherwise obtaining The Fast algorithm develops the corners of the image. It selects corners and key points of the image.

Then, the sift algorithm, the second algorithm, eliminates the edge features and computes descriptors for all of the extracted features from the fast corners. Utilizing these algorithms allows the same image to be detected despite the angle of view. The feature descriptors are then clustered to a range between 0 and 128. The clustering is performed by using a K-means clustering algorithm, then a computer unary feature of each descriptor of a feature. The total number of descriptors for a feature is 128. The total number of features for an image may vary. Using these values, a 128×128 square matrix is computed. Unity of these creates a feature which creates a square matrix. Each feature is a random projection of the square matrix. Data reduction of almost all indexes is covered in the 20 random projections. The Sift algorithm uses similar descriptors to the Fast algorithm. The Sift algorithm constructs a scale space extremum. By using the application of Laplacian of Gaussian approximation, the local maxima and local minima can be determined. This algorithm eliminates the edges inside the image by calculating two gradients perpendicular to each other at the selected key points. The results are the Sift key points.

The Sift descriptors assign orientation to the key points by calculating gradient directions and magnitudes around each key point. The Sift then generates a 16×16 window around the key point and break it into 4×4 sub windows. Then, the Sift algorithm computes a histogram of orientation for the sub windows and puts them into 8 individual bins. The 16 sub-windows, each with 8 bins correspond to create 128 bit descriptors for the key point.

The disclosure uses the Fast algorithm to extract key points of the image. Then, a nearest neighbor algorithm may be applied to choose one of the many key points that are in proximity. The results are Fast key points, but a reduction in the total number of key points. The Fast+Sift algorithm descriptors are calculated by calculating the difference of the Gaussian Pyramid, then constructing a scale space extreme, then application of Laplacian of Gaussian approximation. From then, compute the scales and orientation of the Fast key points. Then the sift descriptors of the resulting Fast key points are computed. These descriptors make up the hash of the image.

Twenty random projections correspond to twenty hash functions. The random projections are chosen in such a way that it takes into account the maximum number of squares out of a 128×128 matrix and corresponding collisions. The projection with fewer collisions is the chosen one. Each random projection then outputs a 36 bit hash value. Each feature will then end up with a 36×20 bit hash value. For all the features, such 36×20 values are computed and served into corresponding buckets, 20 buckets. Once the buckets have been computed, the image becomes the database. The image that contains the image is scanned until the image, the scene is alternated enough so that it no longer is a match. The image with the same scene is categorized as one image.

Certain techniques directed toward image scene recognition may use a sift algorithm, which checks a set of exact key points from each image. The key points typically are distinctive points on the image, such as points of corners or edges including accent points or corners within the image. The points are compared with images from a selected database. The images are then marked as similar or dissimilar. The similar images are then identified with a tag or mark. Using the sift algorithm requires a lot of memory and processing time. The present disclosure is directed to the identification of images based on image characteristics to identify the image from a plurality of images in a database. Implementations of the embodiments use a sift algorithm in combination with a fast algorithm for more efficient processing with improved results with less false positives than just using the sift or fast algorithm alone.

Image hashes or hash values can be created for one or more images. The hash values for each image can be unique to the image (e.g., an image signature) and be representative of image content For an image, instead of using pixels and data, a hash can be created as a signature for the image. The hashes can be stored in a database in a repository. When performing an image scene recognition evaluation for an image-under-test, an image hash can be created for the image-under-test, and the hash can be compared against hashes stored in the database. The hash is representative of the features of the image (e.g., the edges, colors, tones, shapes, etc.). So the hash can be used to compare different images to identify similar images based on features. Because the hashes are formed based on key points and corresponding descriptor vectors, the hash values for a given hash can be representative of those key points (that is, representative of attributes of the image). Thus, the hash can be used to compare one image to another and to identify images that are similar.

For example, starting with 10 images: for each image, a hash can be created that is the signature for the image. For each of the 10 images, a 720 bit hash is created. The hashes are stored in a database. A request may be received to compare an image to one of the ten images for which a hash is stored. A new hash is created for the new image in a similar way as for the previous 10. Using the new hash, the database that has the 10 hashes of the other images is queried.

The key points are identified (or extracted) by a Fast algorithm. Descriptor vectors of the key points are identified using the Sift algorithm. The descriptor vector provides information about the key point of the feature, such as magnitude, direction, etc. Each key point includes a descriptor vector. For each descriptor, there is a value from 0-128 (each row of a 128-dimensional array). For each descriptor, unary feature of length 128 is computed and thereby obtaining a square matrix of dimension 128×128. Hashes may be created by applying a hash function on each of the matrices to identify a hash for each descriptor vector; each hash function generates 36 bits of hash.

In certain implementations, the Fast algorithm generates a large number of key points. Such that computing a descriptor vector for each one using Sift is overly burdensome. In such implementations, instead of using all identified key points, a quantization function can be used to group key points that are close to one another on the image. The quantization function is performed quickly by eliminating edge points and considering only corner points of the keypoints.

FIG. 1 is a block diagram of an example system for image scene recognition. System 100 includes a server 102 and one or more clients 124, 128. Server 102 includes a processor 104. Processor 110 executes image scene recognition analyses, which can be based on requests made by clients, such as client 124. A user of the network can be either an individual or a software application. Processor 110 can be, for example, a central processing unit (CPU), a blade, an application specific integrated circuit (ASIC), or a field-programmable gate array (FPGA), or other type of processors. Although FIG. 1 illustrates a single processor 104 in server 102, multiple processors may be used according to particular needs, and reference to processor 110 is meant to include multiple processors where applicable. In the illustrated implementation, processor 104 is operable to execute instructions. For example, the processor may create hashes for images received from outside the server 102 or that are stored on memory 116. The processor 104 may perform key point identification and extraction using a fast algorithm 106. The processor may also execute Sift algorithm 108 to generate descriptor vectors from the key points. The processor 104 may also execute a "nearest neighbor" evaluation, such as a quantization function, to identify particular key points from a group of key points that are close in proximity to one another. The particular key points may be representative of features in that area of the image, and can be used to represent the group of key points for further analysis (e.g., when a large number of key point has previously been identified). The processor 104 may also execute a hashing function for the key points and descriptors, and store the hashes on memory 116. The processor 104 may also perform a comparison of hashes to identify similar images.

Memory 116 may include any memory or database module and may take the form of volatile or non-volatile memory including, without limitation, magnetic media, optical media, random access memory (RAM), read-only memory (ROM), removable media, or any other suitable local or remote and/or distributed memory and retrieved across a network, such as in a cloud-based computing environment. Memory 116 may store hashes 118 for images. Hashes 118 may be stored in a database or other repository data structure.

Server 102 may be any computer or processing device such as a mainframe, a blade server, general-purpose personal computer (PC), Macintosh®, workstation, UNIX-based computer, or any other suitable device. Generally, FIG. 1 provides merely one example of computers that may be used with the disclosure. In other words, the present disclosure contemplates computers other than general purpose computers, as well as computers without conventional operating systems. The term "computer" is intended to encompass a personal computer, workstation, network computer, mobile computing device, or any other suitable processing device. For example, although FIG. 1 illustrates one server 102 that may be used with the disclosure, system 100 can be implemented using computers other than servers, as well as a server pool. Server 102 may be adapted to execute any operating system including z/OS, Linux-Intel® or Linux/390, UNIX, Windows Server®, or any other suitable operating system. According to one implementation, server 102 may also include or be communicably coupled with a web server and/or an SMTP server.

Network 122 facilitates wireless or wireline communication between computer server 102 and any other local or remote computer, such as client 124. Network 122 may be all or a portion of an enterprise or secured network. In another example, network 122 may be a VPN merely between server 102 and client 124 across a wireline or wireless link. Such an example wireless link may be via 802.11a, 802.11b, 802.11g, 802.11n, 802.20, WiMax, and many others. The wireless link may also be via cellular technologies such as the 3rd Generation Partnership Project (3GPP) Global System for Mobile Communications (GSM), Universal Mobile Telecommunications System (UMTS), Long Term Evolution (LTE), etc.

While illustrated as a single or continuous network, network 122 may be logically divided into various sub-nets or virtual networks without departing from the scope of this disclosure, so long as at least portion of network 122 may facilitate communications between senders and recipients of requests and results. In other words, network 122 encompasses any internal and/or external network, networks, sub-network, or combination thereof operable to facilitate communications between various computing components in system 100. Network 122 may communicate, for example, Internet Protocol (IP) packets, Frame Relay frames, Asynchronous Transfer Mode (ATM) cells, voice, video, data, and other suitable information between network addresses. Network 122 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 122 may be a secure network associated with the enterprise and remote clients 104, 106 and 108.

System 100 allows for a client, such as client 124, to submit query requests to the server 102 and retrieve search results from the server 102. Client 124 may send a query request 140 to the server 102 via the network 122. Upon receiving the request 140, the server 102 may identify at least one relevant query result and deliver the identified query result to the client 124. The system 100 may include other clients, such as 128, in addition to client 124. The client 128 may include a graphical user interface (GUI) 132 that may be presented to the client 128. Similar to the client 124, the client 128 may send a query request to the server 102 via the network 122 and receive at least one identified query result from the server 102.

It will be understood that there may be any number of clients communicably coupled to server 102. This disclosure contemplates that many clients may use a computer or that one user may use multiple computers to submit or review queries via a graphical user interface (GUI) 134. As used in this disclosure, clients may operate remote devices, such as personal computers, touch screen terminals, workstations, network computers, kiosks, wireless data ports, wireless or wireline phones, personal data assistants (PDAs), one or more processors within these or other devices, or any other suitable processing device, to execute operations associated with business applications. For example, client 124 may be a PDA operable to wirelessly connect with an external or unsecured network. In another example, client 124 may comprise a laptop that includes an input device, such as a keypad, touch screen, mouse, or other device that can accept information, and an output device that conveys information associated with the operation of server 102 or client 124, including digital data, visual information, or GUI 126. Both the input device and output device may include fixed or removable storage media such as a magnetic computer disk, CD-ROM, or other suitable media to both receive input from and provide output to users of client 124 through the display, namely, over GUI 126.

GUI 126 includes a graphical user interface operable to allow the user of client 124 to interface with at least a portion of system 100 for any suitable purpose, including viewing, manipulating, editing, etc., graphic visualizations of user profile data. Generally, GUI 126 provides the user of client 124 with an efficient and user-friendly presentation of data provided by or communicated within system 100. GUI 126 may comprise a plurality of customizable frames or views having interactive fields, pull-down lists, and buttons operated by the user. In one implementation, GUI 126 presents information associated with queries and buttons and receives commands from the user of client 124 via one of the input devices. Moreover, it should be understood that the terms graphical user interface and GUI may be used in the singular or in the plural to describe one or more graphical user interfaces and each of the displays of a particular graphical user interface. Therefore, GUI 126 contemplates any graphical user interface, such as a generic web browser or touch screen, which processes information in system 100 and efficiently presents the results to the user. Server 102 can accept data from client 124 via the web browser (e.g., Microsoft® Internet Explorer or Mozilla® Firefox®) and return the appropriate HTML or XML responses using network 122. For example, server 102 may receive a search request from client 124 using a web browser or application-specific graphical user interface, and then may execute the request to search for business entities that fulfill certain criteria and provide the search results to the user interface.

FIG. 2 is a process flow diagram 200 for create hash values for an image. Images are input into a system or cycle for processing (202). Features can be identified at different locations within the sample image. During image input, preprocessing of the image can occur, such as resizing, smoothening, and/or gray valuing. Other preprocessing can also be performed. Key points are extracted from the images, for example, using a Fast algorithm (204). In certain implementations, key points from the image can be extracted. The edge features can be omitted and corner features can be included, in some example implementations. In certain instances, clustering of key points is performed when there are a large number of key points identified, and computation of all of them would be overly burdensome (206). The term "overly burdensome" is a term that may be user specific, and can be set or defined by each operator uniquely. K-means clustering can be used, for example. Key point descriptors can be clustered to a range between 0 and 128. Descriptor vectors for the key points extracted can be computed using Sift algorithm (208). Descriptor vectors can be identified for at least a subset of the features, the subset defining key points of the image, the descriptor vectors describing local image information around the key points, where each descriptor vector is an n-dimensional array and is represented as a unary feature of dimension 128×128.

The key points can be hashed (210). Key points can be generated based on hashes of data vectors that include at least one of the descriptors, where each feature is a 36×20 hash value. For each key point, a unary feature of each descriptor of the feature can be computed. A total number of descriptors for a feature may be equal to 128 in some implementations. The total number of key points for an image may vary. Because there are 128 descriptors of value ranging from 0 to 128, after computing the unary features, the result is a square matrix of dimension 128×128. Twenty random projections correspond to 20 hash functions that are computed beforehand. Random projections may be chosen in such a way that it takes into account the maximum number of squares out of 128×128 with less collisions. Each random projection outputs 36 bit hash value. The total bits of hash value for a single feature is 36×20 bits. For all the features, such 36×20 values are computed and served into corresponding 20 buckets.

FIG. 4 is a process flow diagram 300 from retrieving an image hash from a database. A query for an image recognition is received (302). For each key point of a queried image for which 20×36 bits hash values are computed, each 36 bits hash value is searched for a match in the corresponding bucket (304). A queried key point is identified in a potentially matching key point (306). A queried key point is defined as a matching key point in the database only if the number of matches per 20 buckets crosses a threshold (308). If the number of matching key points exceeds a threshold, the key point is said to be matching. If not, then a no match is returned (310).

For instance, if the threshold is 10, then for a feature to be matched there should be matches for the 36 bits hash values in at least 10 buckets out of 20. If a feature (A) is supposed to be matched with the database, then its neighboring features are computed within a certain radius of the matched feature. Out of these neighboring features, at least one other feature (B) should be termed as a matching feature. If not, then feature (A) is discarded else the number of matched features is counted for an image. If the number of matched features crosses a threshold (312), then queried image is said to have a similar image in the database (316). Otherwise, there is no matching image (314).

A number of implementations of the disclosure have been described. Nevertheless, it will be understood that various modifications may be made without departing from the spirit and scope of the disclosure. Accordingly, other implementations are within the scope of the following claims. It is to be understood that the claim elements listed below may be performed in the order shown or n a different order.

What is claimed is:

1. A method of creating an image hash, comprising:
    identifying features at different locations within a sample image;
    identifying descriptor vectors for at least a subset of the features, the subset defining key points of the image, the descriptor vectors describing local image information around the key points, where each descriptor vector is an n-dimensional array and is represented as a unary feature of dimension 128×128; and
    generating key points based on hashes of data vectors that include at least one of the descriptors, where each feature is a 36×20 hash value.

2. The method of claim 1, wherein the hashes are performed using a hash function for which a probability that the hash of an arbitrary first vector corresponds to the hash of an arbitrary second vector is a function of a range between the first vector and the second vector.

3. The method of claim 2, wherein the hash function generates a characteristic data string from a data vector larger than the characteristic data string, wherein the arbitrary first vector is a first descriptor vector, and the arbitrary second vector is a second descriptor vector.

4. The method of claim 2, wherein each feature corresponds to multiple keypoints, and each feature is a 36×20 has value.

5. The method of claim 1, wherein each feature comprises:
    a hash value of a first descriptor vector for a first keypoint,
    a hash value of a second descriptor vector for a second key point,
    a first quantization function mapping an orientation of the first key point in relation to the second key point to a range of integers, and
    a second quantization function mapping an orientation of the second key point in relation to the first key point to the range of integers.

6. The method of claim 1, further comprising executing a quantization function mapping an orientation of each key point to a range of integers.

7. The method of claim 1, wherein each hash value is calculated by using a fast algorithm in combination with a sift algorithm.

8. The method of claim 1, wherein each key point is obtained using a fast algorithm.

9. The method of claim 1, wherein each descriptor vector is obtained using a sift algorithm.

* * * * *

UNITED STATES PATENT AND TRADEMARK OFFICE
CERTIFICATE OF CORRECTION

PATENT NO. : 9,087,267 B2
APPLICATION NO. : 13/493986
DATED : July 21, 2015
INVENTOR(S) : Steven W. White and Ashok Ramadass Page 1 of 1

It is certified that error appears in the above-identified patent and that said Letters Patent is hereby corrected as shown below:

In the claims

In Column 8, In Line 48, In Claim 4, delete "keypoints," and insert -- key points, --, therefor.

In Column 8, In Line 48, In Claim 4, delete "has" and insert -- hash --, therefor.

In Column 8, In Line 51, In Claim 5, delete "keypoint," and insert -- key point, --, therefor.

Signed and Sealed this
Twenty-eighth Day of June, 2016

Michelle K. Lee
*Director of the United States Patent and Trademark Office*